(12) United States Patent
Engle et al.

(10) Patent No.: US 8,768,802 B2
(45) Date of Patent: Jul. 1, 2014

(54) SYSTEM AND METHOD OF MATCHING FINANCIAL TRANSACTION RECORDS TO MERCHANT RECORDS OF A MERCHANT PROFILE DATABASE

(75) Inventors: Traci Engle, Dublin, CA (US); Bryan Carroll, Redwood City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 385 days.

(21) Appl. No.: 12/630,667

(22) Filed: Dec. 3, 2009

(65) Prior Publication Data

US 2011/0137928 A1 Jun. 9, 2011

(51) Int. Cl.
*G06Q 40/00* (2012.01)
(52) U.S. Cl.
USPC ............. 705/35; 707/769; 707/758; 707/690; 707/691; 707/692
(58) Field of Classification Search
USPC .......................................................... 705/35
See application file for complete search history.

(56) References Cited

U.S. PATENT DOCUMENTS

| | | | |
|---|---|---|---|
| 2002/0198824 A1* | 12/2002 | Cook | 705/38 |
| 2003/0088562 A1 | 5/2003 | Dillon et al. | |
| 2003/0158844 A1 | 8/2003 | Kramer et al. | |
| 2004/0162778 A1 | 8/2004 | Kramer et al. | |
| 2004/0215543 A1* | 10/2004 | Betz et al. | 705/35 |
| 2008/0086365 A1* | 4/2008 | Zollino et al. | 705/10 |
| 2009/0024471 A1* | 1/2009 | Nielson et al. | 705/14 |
| 2009/0076935 A1* | 3/2009 | Knowles et al. | 705/30 |
| 2011/0029416 A1* | 2/2011 | Greenspan | 705/30 |

FOREIGN PATENT DOCUMENTS

WO 2004107097 A2 12/2004

OTHER PUBLICATIONS

Search/Examination Report dated Aug. 2, 2011 from International Patent Application No. PCT/US2010/058558, 9 pages.

* cited by examiner

*Primary Examiner* — Rajesh Khattar
*Assistant Examiner* — Arunava Chakravarti
(74) *Attorney, Agent, or Firm* — Loeb & Loeb LLP (57) ABSTRACT

A system and method for matching transaction records to merchant records of a merchant profile database is provided, the transaction records containing transaction data of financial presentation devices that are presentable to a plurality of merchants, the transaction data including merchant identifying data that identifies the merchant for the transaction. The system includes a memory storing a plurality of transaction records, a merchant profile database storing a plurality of merchant profile records, a processor, and a match logic module executable by the processor and adapted to recognize a plurality of variations in the merchant identifying data contained in the transaction records, the match logic module operable to match each of the transaction records to an associated merchant profile record in the merchant profile database according to the recognized variations in the merchant identifying data.

23 Claims, 7 Drawing Sheets

| CORRECTED (if checked) | | | |
|---|---|---|---|
| PAYER'S name, street address, city, state, ZIP code, and telephone no. | OMB No. 1545-0115<br>2009<br>Form 1099-MISC | | Miscellaneous Income |
| | | | Copy B<br>For Recipient |
| | 1 Rents<br>$ | | |
| | 2 Royalties<br>$ | 4 Federal income tax withheld<br>$ | |
| | 3 Other income<br>$ | 6 Medical and health care payments<br>$ | This is important tax information and is being furnished to the Internal Revenue Service. If you are required to file a return, a negligence penalty or other sanction may be imposed on you if this income is taxable and the IRS determines that it has not been reported. |
| | 5 Fishing boat proceeds<br>$ | | |
| PAYER'S federal identification number | RECIPIENT'S identification number | 7 Nonemployee compensation<br>$ | 8 Substitute payments in lieu of dividends or interest<br>$ |
| | | 9 Payer made direct sales of $5,000 or more of consumer products to a buyer (recipient) for resale ▲ ☐ | 10 Crop insurance proceeds<br>$ |
| RECIPIENT'S name | | 11 | 12 |
| Street address (including apt. no.) | | 13 Excess golden parachute payments<br>$ | 14 Gross proceeds paid to an attorney<br>$ |
| City, state, and ZIP code | | | |
| Account number (see instructions) | | 16 State tax withheld<br>$<br>$ | 17 State/Payer's state no. | 18 State income<br>$<br>$ |
| 15a Section 409A deferrals<br>$ | 15b Section 409A income<br>$ | | |
| Form 1099-MISC | (keep for your records) | | Department of the Treasury - Internal Revenue Service |

SYSTEM AND METHOD OF MATCHING FINANCIAL TRANSACTION RECORDS TO MERCHANT RECORDS OF A MERCHANT PROFILE DATABASE

FIELD OF THE INVENTION

The present invention relates to data processing systems and more particularly relates to a system and method of matching records of transactions made using a financial presentation device with merchant profile records.

BACKGROUND OF THE INVENTION

When a financial presentation device such as a credit card or debit card is used to make a purchase from a merchant, data pertaining to the transaction including such information as the card account number, the merchant name, the transaction date, and the purchase amount is generated at the merchant location (point of sale) and transmitted electronically to an acquirer. The transaction data is passed from the acquirer to a financial service network and then to an issuer (i.e., the entity the issues the financial presentation device) that provides authorization for the transaction. Upon authorization, the financial service network generates a settlement record of the transaction. The issuer uses the settlement record to generate another transaction record that also includes customer-related (e.g., corporation) data. The issuer-generated transaction records are in turn useful to financial service networks, such as Visanet®, for generating tax reports and other purposes, particularly when matched and enriched with merchant related data (merchant profile records) stored by the financial service network. However, there is a drawback in relying on issuer-generated data, in that it has been found that despite the fact that the transaction records have a standard format, issuers sometimes introduce variations or anomalies into the data of the transaction records, for example, by appending extraneous data in certain fields. These variations, some of which are common, make it a difficult task to match the issuer-generated transaction records with corresponding merchant profile records stored (which would match but for the variations).

Therefore, it is desirable to provide a system and method that correctly matches transaction records with merchant profile records by accounting for known variations.

SUMMARY OF THE DISCLOSURE

According to a first aspect, the present invention provides a system for matching transaction records to merchant records of a merchant profile database in which the transaction records contain transaction data of financial presentation devices that are presentable to a plurality of merchants, and the transaction data includes merchant identifying data that identifies the merchant for the transaction. The system includes a memory storing a plurality of transaction records, a merchant profile database storing a plurality of merchant profile records, a processor, and a match logic module executable by the processor and adapted to recognize a plurality of variations in the merchant identifying data contained in the transaction records. The match logic module is operable to match each of the transaction records to an associated merchant profile record in the merchant profile database according to the recognized variations in the merchant identifying data.

According to a second aspect, the present invention provides a system for matching transaction records to merchant records of a merchant profile database in which the transaction records contain transaction data of financial presentation devices that are presentable to a plurality of merchants, and the transaction data includes merchant identifying data that identifies the merchant for the transaction. The system includes a memory storing a plurality of transaction records, a merchant profile database storing a plurality of merchant profile records, a processor, and a match logic module executable by the processor. The match logic module is adapted to recognize a plurality of variations in the merchant identifying data contained in the transaction records, determine whether the merchant identifying data in a transaction record contains at least one of the plurality of recognized variations, correct the merchant identifying data if it is determined that the merchant identifying data contains at least one of the plurality of recognized variations, and match the transaction records to associated merchant profile records in the merchant profile database based on the corrected merchant identifying data.

According to a third aspect, the present invention provides a method of matching transaction records to merchant records of a merchant profile database in which the transaction records contain transaction data of financial presentation devices that are presentable to a plurality of merchants, and the transaction data includes merchant identifying data that identifies the merchant for the transaction. The method includes receiving the transaction records and matching each of the transaction records to an associated merchant profile record in the merchant profile database according to a plurality of recognized variations in the merchant identifying data.

DETAILED DESCRIPTION OF THE INVENTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, smart cards, key chain devices, personal digital assistants, cell phones, stored value devices or the like so long as the device can be presented to a seller of goods or services for payment.

A financial presentation device such as a credit card or debit card may be used to purchase goods or services from a merchant in a commercial transaction. At the merchant premises, data pertaining to the transaction is generated using merchant premises equipment (a card reader). The transaction data includes, among other information, card number, card holder name, merchant name, merchant city and state, transaction date and time, and purchase amount information. The transaction data is communicated from the merchant through a financial services network in order to authorize the transaction; more specifically, an authorization request including the transaction data is transmitted from the merchant to an acquirer with which it is affiliated. The request is then transmitted from the acquirer through a secure financial services network, such as Visanet, to the issuer at which the customer's account is held. Typically, the issuer then determines whether to authorize the transaction based on criteria such as whether the customer has reached a credit limit or is in default on payments (although the financial services network may also perform a portion or all of the authorization process).

After the transaction has been authorized, the financial services network generates a settlement record that includes and stores the transaction data. In addition, the issuer generates a record which includes the transaction data and also includes customer-related data to which issuer has access but the financial services network may not (e.g., the corporation name if the customer is a corporation). Financial services networks are expanding their repertoire of services; one of services offered is provision of financial reports such as tax forms for corporate clients. To produce certain tax forms, such as the 1099-MISC form which is used to report transactions for services, merchant related information is required that the issuer is not privy to, and is thus not included in the transaction record. To supplement the transaction record with merchant related data, the financial services network queries a merchant profile database using data that identifies the merchant within a transaction record ('merchant identifying data') with the aim of matching the merchant involved in the transaction with a merchant in the merchant profile database. According to some embodiments, the merchant identifying data includes four fields: merchant name, merchant city, merchant state, and merchant category code (MCC). The query attempts to match each of these fields against a merchant profile record in the merchant profile database.

Since the database query typically only returns exact matches, slight variations in any of the fields of the merchant identifying data between a transaction record and a merchant profile record will result in a non-match even though the records may correspond, i.e., the merchants in the two records may be the same. The present invention reduces the probability of corresponding records not matching by detecting known variations in the merchant identifying data that can be corrected or normalized so that the merchant identifying data can then be matched against corresponding merchant profile data in a merchant profile record. According to an embodiment of the present invention, matching logic searches for preset patterns of variations, corrects (removes) the variations in the merchant identifying data of the transaction record, and then re-queries the merchant profile data base using the corrected or 'normalized' merchant identifying data. Known types of variations include, among others, extraneous information in the merchant name field (e.g., invoice information, store information, additional character(s)), and phone numbers in the merchant state field that includes non-numerical characters.

Figure 1:
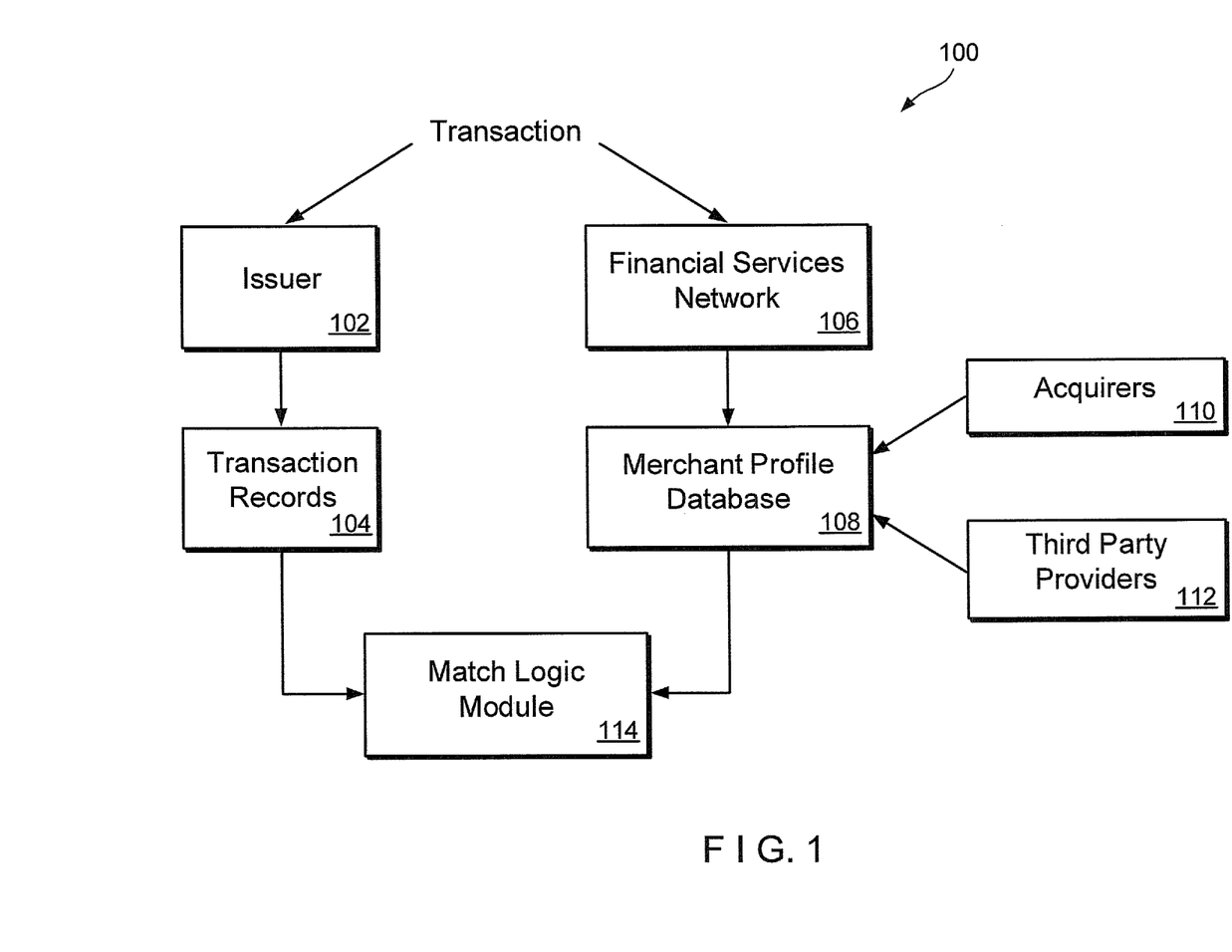
FIG. 1 is a block diagram of an exemplary system for matching transaction records to merchant records of a merchant profile database according to an embodiment of the present invention.

An exemplary block diagram of a system 100 for matching transaction records with merchant profile records according to an embodiment of the present invention is shown in FIG. 1. Issuer 102 represents one or more issuer banks that issue financial presentation devices to customers, maintain corresponding account records, and authorize commercial transactions executed with financial presentation devices. When a transaction is executed, data pertaining to the transaction is communicated to the issuer 102 via a financial services network 106. Using the data obtained, the issuer 102 generates a transaction record including the details of the transaction such as the financial presentation device (card) account number, the date and time of the transaction, the dollar amount of the transaction and merchant identifying data including the merchant name, the city and state where the merchant is located and a merchant category code (MCC).

Figure 4:
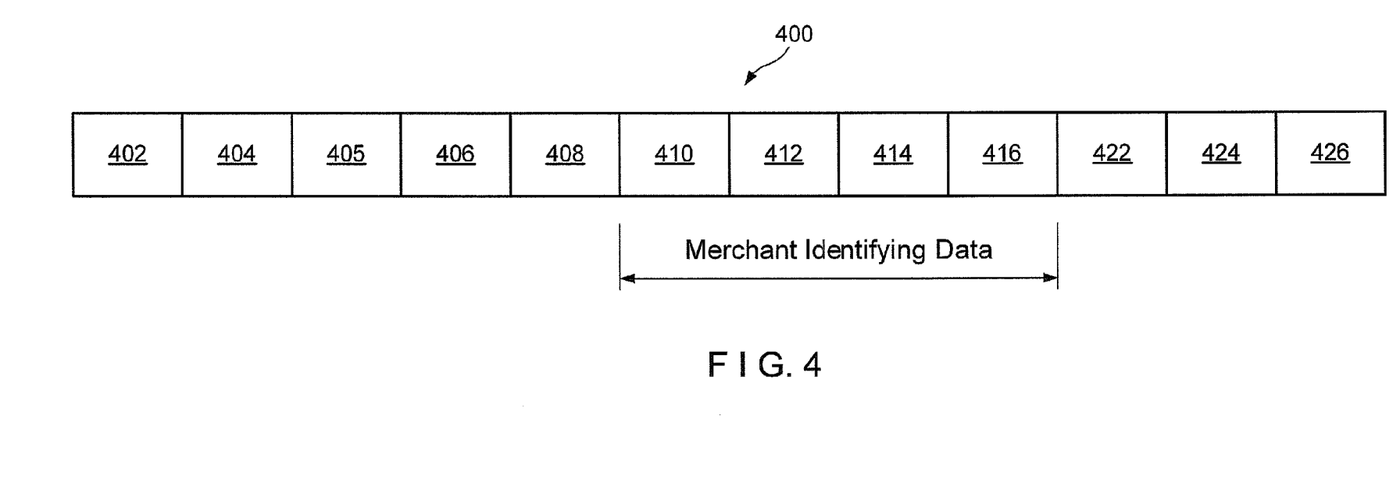
FIG. 4 is a schematic diagram of an exemplary transaction record.

The transaction record may also include additional information concerning the customer account and the commercial transaction. In one or more embodiments, the issuer generates the transaction record in Visa Commercial Format (VCF), the specifications for which may be found in the document "Visa Commercial Format 4.0" published by Visa, Inc. in 2007, which is hereby incorporated by reference. An exemplary transaction record that may be generated by issuer 102 is shown in FIG. 4. As shown, the transaction record includes a transaction number 402, an account number 404, a customer (e.g., corporation) name 405, a transaction date 406, a transaction time 408, the merchant name 410, the city 412 and state 414 where the merchant is located, the MCC 416 (items 410, 412, 414, 416 being collectively labeled as merchant identifying data), a purchase amount 422, customer address 424 and an acquirer bank identification number (BIN) 426.

Transaction records generated by the issuer 102 are received and stored in a VCF transaction record file 104. The issuer 102 may provide the transaction records file 104 on a storage medium such as a magnetic or optical disk, or may communicate the transaction records over a public network or dedicated line preferably having high data transmission capacity.

Upon authorization of the transaction, the transaction data is also stored in the form of a settlement record by the financial services network 106. The financial services network 106 is coupled to a merchant profile database 108 which stores data pertaining to a plurality of merchants. The data stored in the merchant profile database 108 is supplied from acquirers 110 affiliated with the merchants (e.g., banks which maintain the merchants' financial accounts) and also from third party providers 112 that may supply detailed socio-economic information pertaining to the merchants, such as minority or female ownership status. The merchant profile records include such information as the merchant name, street address, city, state, MCC, and tax ID.

A matching logic module 114, described in greater detail below, is a computer-executable program that is coupled to the transaction record file 104 so as to receive transaction records therefrom, and is also coupled to the merchant profile database 108 so as to be able to query the merchant profile database 108 and receive merchant profile records and/or merchant profile data in response.

Figure 2:
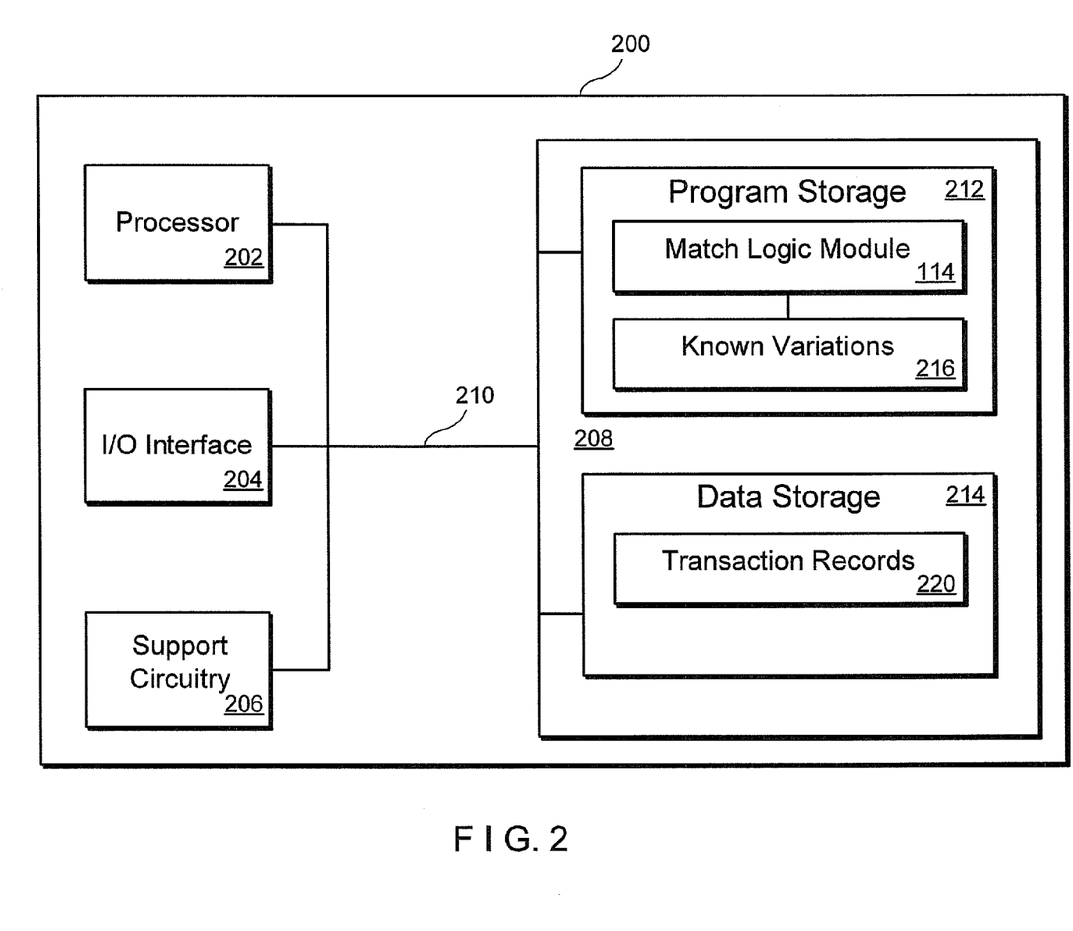
FIG. 2 is a block diagram of an exemplary computer adapted to execute a match logic module according to an embodiment of the present invention.

Referring now to FIG. 2, a block diagram of an exemplary computer 200 including program code for a matching logic module 114 according to an embodiment of the present invention is shown. The computer 200 includes a processor 202, such as a central processing unit (CPU), an I/O interface 204 which sends/receives information via a communication link (not shown) and support circuitry 206. The processor 202, I/O interface 204 and support circuitry 206 are commonly connected to a bus 210 which also connects to a memory 208. The bus 210 is also coupled to the merchant profile database 108.

The memory 208 may include both volatile (RAM) and non-volatile (ROM) memory units and may also include hard disk and backup storage capacity. The memory 208 stores software programs in a program storage portion 212 and stores data in a data storage portion 214. The program storage portion 212 includes the match logic module 114. The match logic module 114 includes software instructions for performing the matching methods according to the present invention and also stores known variations and solutions 216 in the merchant identifying data of transaction records. Transaction records received by the computer 200 from the issuer 102 (via the I/O interface 204) are stored in transaction records data storage 220 which is a portion of the data storage 214 allocated for storing the transaction records locally. Software program modules in the program storage 212 and data from the data storage portion 214 are transferred from memory on as-needed basis as directed by the processor 202.

It is to be appreciated that the computer 200 can be any computer such as a personal computer, minicomputer, workstation, mainframe, or a combination thereof. While the computer 200 is shown, for illustration purposes, as a single computer unit, the system may comprise a group/farm of computers which can be scaled depending on the processing load and database size.

Figure 3:
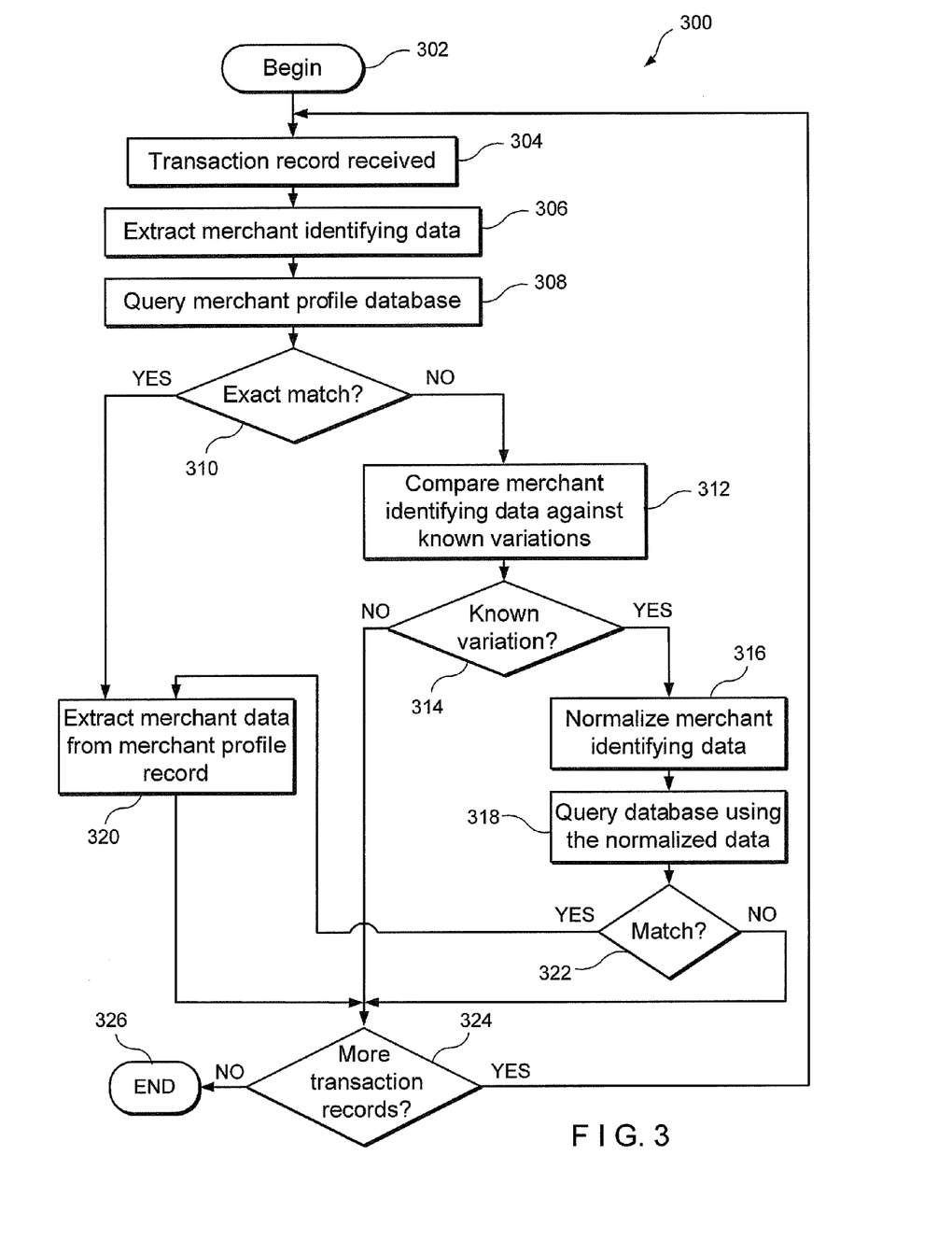
FIG. 3 is a flow chart of a method of matching transaction records to merchant records of a merchant profile database according to an embodiment of the present invention.

Referring now to FIG. 3, a flow chart of an exemplary method 300 of matching transaction records to merchant records of a merchant profile database according to the present invention is shown. The method begins in step 302. In step 304, a transaction record is received by the match logic module 114 from transaction records data storage 220. In step 306, the match logic module 114 extracts the merchant identifying data in the transaction record, and in step 308, queries the merchant record database 108 with the merchant identifying data. In step 310, the match logic module 114 receives a query response from the merchant profile database indicating whether the merchant identifying data in the query exactly matches data in a merchant profile record of the merchant profile database 108 on a field-by-field basis. In other words, the query response indicates whether the one of the merchant profile records includes the exact same name, city, state and MCC as the merchant identifying data of the transaction record. If the query response includes a merchant profile record, indicating an exact match, in step 320, the match logic module 114 extracts certain fields of data from the merchant profile record for subsequent use.

Figure 5:
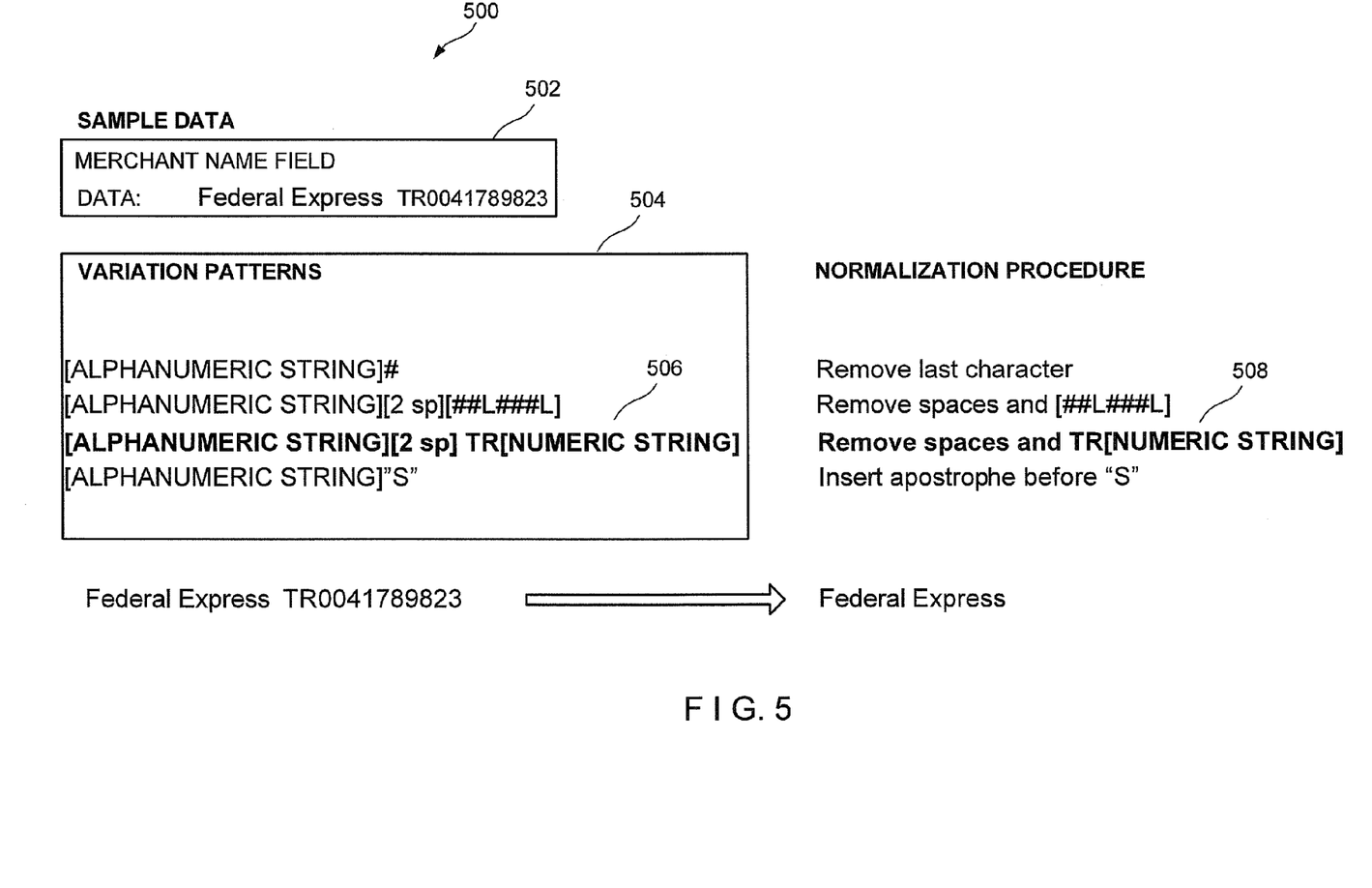
FIG. 5 is a schematic diagram showing detection of a variation in the merchant name field of exemplary merchant identifying data according to an embodiment of the present invention.

If the query response from step 310 is empty, indicating that there was no exact match for the merchant identifying data in the merchant profile database, the match logic module 114 determines that the transaction record is 'unmatched'. It has been found that a significant portion of transaction records that remain unmatched after a first matching round actually contain useful data but have variations that confound 'exact' matching logic. To account for such variations, in step 312, the match logic module 114 compares each of the fields of merchant identifying data against known variations or patterns to determine whether each field contains a known variation. FIG. 5 depicts an example comparison 500 in which the merchant name field 502 of a transaction record is compared against several known variations. In the depicted example, the merchant name field contains the data "Federal Express TR0041789823", where the merchant is Federal Express and the term beginning with 'TR' represents a tracking number which is often appended to the merchant name field in transactions involving Federal Express.

Since a merchant profile record for Federal Express will typically not include any tracking information (assuming Federal Express is in the merchant profile database), the merchant name within the transaction record will not match against any merchant profile record. However, when the merchant name field is compared against the variation patterns 504 shown in FIG. 5, it can be seen that "Federal Express TR0041789823" matches the highlighted pattern "[ALPHANUMERIC STRING][2 sp]TR[NUMERIC STRING]" 506, which describes an alphanumeric string followed by two spaces followed, in turn, by a numeric string (without letters). The variation pattern 506 is expressly designed to detect Federal Express data or any other vendor that appends a tracking number starting with "TR" in the manner of the depicted Federal Express record. It is noted that the example shown in FIG. 5 is merely illustrative and should not be taken as representative of actual content of transaction records involving Federal Express Inc.

Figure 6:
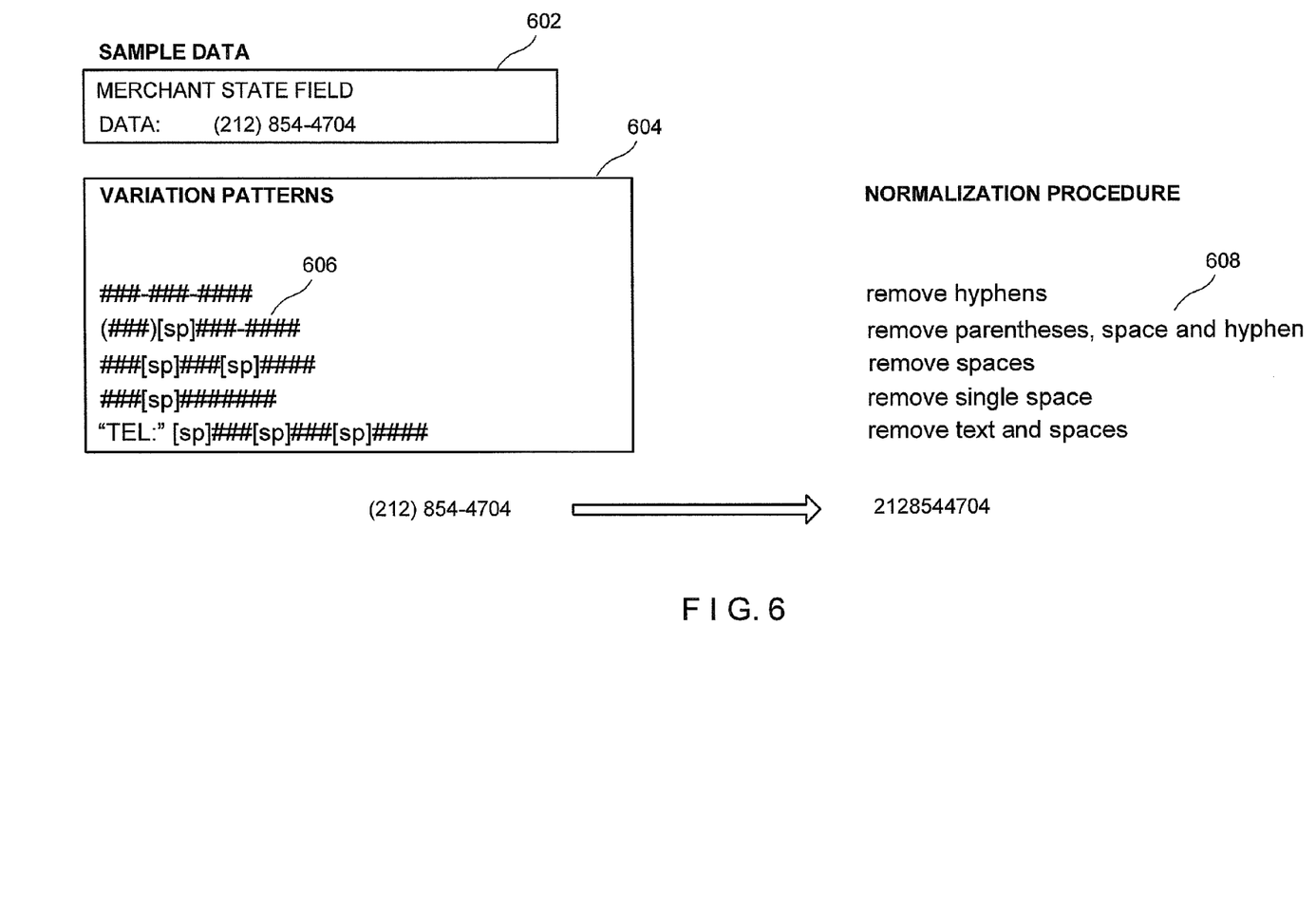
FIG. 6 is a schematic diagram showing detection of a phone number variation in the state field of exemplary merchant identifying data according to an embodiment of the present invention.

FIG. 6 depicts another example comparison 600 in which the merchant state field 602 of a transaction record includes a phone number "(212) 854-4704" and the match logic module 114 determines whether the data matches a known format. Merchant location data may be encoded in transaction records as a phone number in one of a number of formats by some merchants or issuers since the area code of a phone number carries state information. For some merchants, such as Internet merchants, corresponding merchant profile records may also include a phone number in the state field (or in another address field). However, the phone numbers stored in the merchant profile records are typically formatted as ten consecutive digits without any special characters such as parentheses or dashes. Therefore, the format of a phone number in the state field in a transaction record may not match the 10 digit format of merchant profile records, and in this case the records will not match. To correct this problem, the merchant state data of an unmatched record is compared against a set of known phone number format variations 604. In the depicted example, the merchant state data "(212) 854-4704" matches the highlighted pattern (###)[sp]###-####, which represents open parenthesis, followed by three consecutive digits, a close parenthesis, a space, three consecutive digits, a hyphen and four further consecutive digits.

Referring again to FIG. 3, in step 314, it is determined whether the merchant identifying data includes a known variation as in the examples of FIGS. 5 and 6. If it is determined that the merchant identifying data includes a known variation in step 314, in step 316 the merchant data is normalized so as to remove the variation using the known variations and solutions 216 stored in the storage 216. If it is determined that the merchant identifying data does not include a known variation, the transaction record remains unmatched and the method branches to step 324. With respect to the example shown in FIG. 5, normalization 508 involves removing the appended portion of the merchant name 502, in particular the two spaces and the tracking number ([2 sp]TR[NUMERIC STRING])which are positioned immediately adjacent 'Federal Express'. And with respect to the example shown in FIG. 6, normalization 608 involves removing the parentheses, the space and the hyphen, converting the phone number to a sequence of consecutive digits. In general, each variation in the merchant identifying data will have a different corresponding normalization procedure 216 used to convert the variation to the standard or normalized form.

In step 318, the match logic module 114 queries the merchant profile database using the normalized merchant profile data. In step 322 it is determined whether there is a match. If there is a match, the process branches to step 320, and the merchant profile data is extracted for subsequent use, for example, the merchant profile data may be entered into reports and forms as discussed with reference to FIG. 7 below. In an alternate embodiment, the transaction record itself may be changed to reflect the corrected merchant identifying information. One way is to modify the merchant identifying fields while another way would be to append the correct merchant identifying data. After step 320, or if the query of step 322 returns empty, indicating that despite the normalization of the data, there is no match between the merchant identifying data of the transaction record and corresponding data in a merchant profile record, the method branches to step 324, in which it is determined whether there are further transaction records to process. If there are further transaction records to process, the method cycles back to step 304, and if there are no further transaction records to process, the method ends in step 326. In some embodiments of the present invention, the process may be nested, whereby the merchant identifying data may be tested with a different set of variations in each round. In this manner, the number of unmatched transaction records may be filtered down iteratively and the successful matching rate thereby increased.

Figure 7:
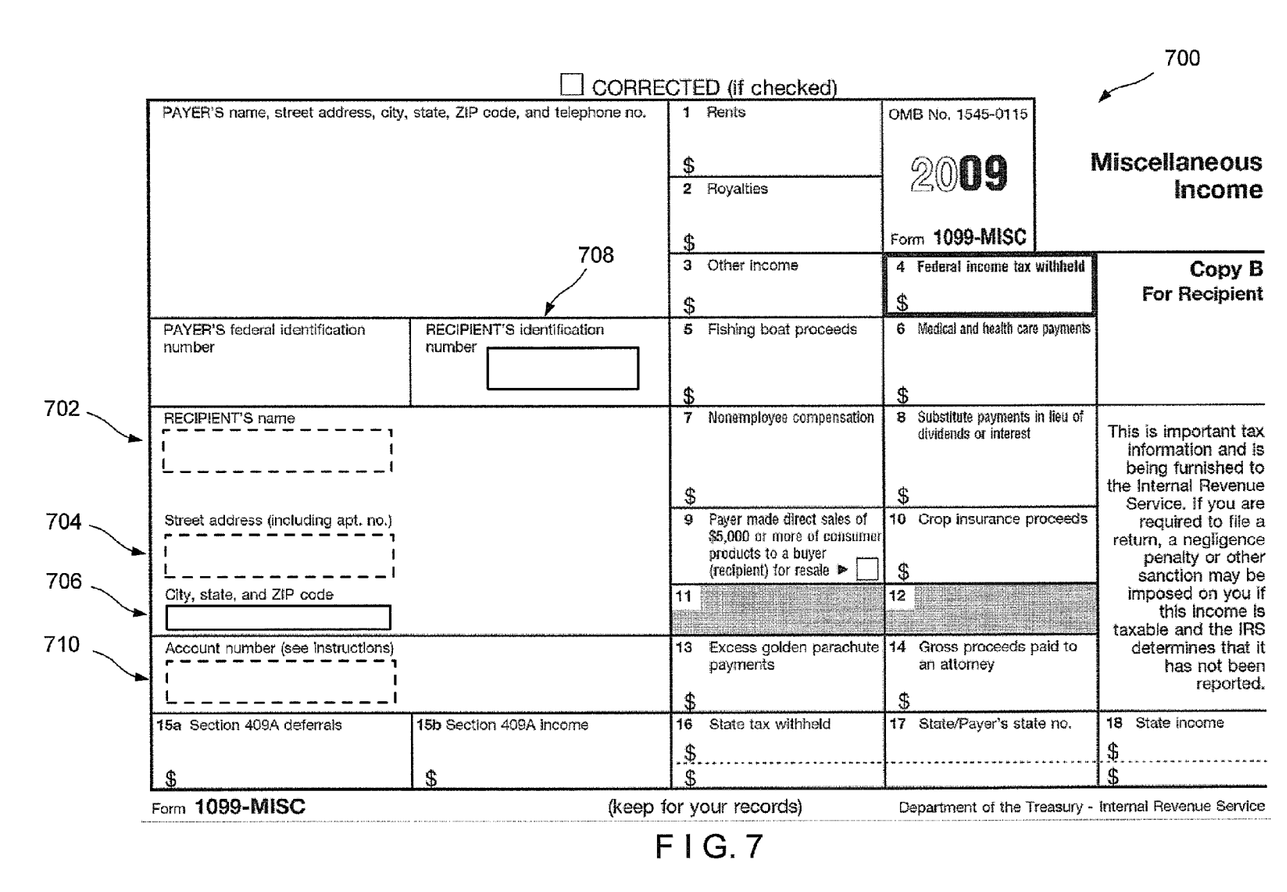
FIG. 7 is an exemplary tax form 1099-MISC that may be filled using transaction records and merchant profile data according to an embodiment of the present invention.

As noted above, the financial service network 106 (FIG. 1) uses the combination of a transaction record combined with supplemental merchant data extracted from the merchant profile database in producing reports or forms. FIG. 7 shows an example IRS Form 1099-MISC which is used by corporations to report transactions for services to the Internal Revenue Service. The form includes sections where recipient (merchant) information is input including sections for inputting a merchant name 702, merchant street address 704, merchant city and state 706, merchant tax identification number 708 and merchant account number 710. As the data for sections 702, 704, 706, 708 and 710 can be obtained from the merchant profile database (when it is not already included in the merchant identifying data in the transaction record), the input of the information in form 700 may be automated. For example, when a match is found, and a merchant profile record is returned, information can be extracted from the merchant profile record and entered into an electronic version of the form 700. In particular, with respect to the 1099-MISC form depicted, it is important to enter the correct recipient tax identification number 708 and address information, so that the appropriate merchant may be taxed and then notified of the tax imposed on the transaction.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for matching transaction records to merchant records of a merchant profile database, the transaction records containing transaction data of financial presentation devices that are presentable to a plurality of merchants, the transaction data including merchant identifying data that identifies the merchant for the transaction, the system comprising:
   a memory storing a plurality of transaction records;
   a merchant profile database storing a plurality of merchant profile records; and
   a processor wherein the memory further stores a match logic module executable by the processor and physically configured to:
      recognize a plurality of format variations for a merchant field value in a merchant field in merchant identifying data contained in a transaction record;
      determine whether a format of the merchant field value in the merchant field corresponds to one of the recognized format variations wherein the processor is physically configured to:
         determine whether the merchant field value has all of a merchant name variation, a merchant address variation, a merchant category code (MCC) variation and a merchant phone number variation;
      normalize the merchant field value in response to determining that the format of the merchant field value in the merchant field corresponds to one of the recognized format variations wherein the processor is physically configured to:
         determine whether the merchant name variation comprises a known merchant name variation;
         in response to a positive determination that the merchant name variation comprises a known merchant name variation,
            execute a related merchant name variation normalization procedure and store a normalized merchant name as part of a normalized field value; and
         determine whether the merchant address variation comprises a known merchant address variation;
         in response to a positive determination that the merchant address comprises a known merchant address variation
            execute a related merchant address variation normalization procedure and store a normalized merchant address as part of a normalized field value; and
         determine whether the merchant MCC variation comprises a known merchant MCC variation;
         in response to a positive determination that the MCC variation comprises a known merchant MCC variation
            execute a related merchant MCC variation normalization procedure and store a normalized MCC as part of a normalized field value; and
         determine whether the phone number variation comprises a known merchant phone number variation;
         in response to a positive determination that the phone number comprises a known merchant phone number variation
            execute a related phone number variation normalization procedure and store a normalized phone number as part of a normalized field value; and
      match the transaction record to a corresponding merchant profile record in the merchant profile database based at least in part on the normalized field value.

2. The system according to claim 1, wherein the merchant identifying data comprises a merchant name and one of the plurality of format variations for the merchant field value comprises an inclusion of one or more extra characters in the merchant name.

3. The system according to claim 2, wherein the match logic module is physically configured to output a tax identifier or a merchant address contained in the matched merchant profile record for each transaction record.

4. A method of matching transaction records to merchant records of a merchant profile database, the transaction records containing transaction data of financial presentation devices that are presentable to a plurality of merchants, the transaction data comprises merchant identifying data that identifies the merchant for the transaction, the method comprising:

recognizing, by a computer, a plurality of format variations for a merchant field value in a merchant field in merchant identifying data contained in a transaction record;

determining, by the computer, whether a format of the merchant field value in the merchant field corresponds to one of the recognized format variations;

determining whether the merchant field value has all of a merchant name variation, a merchant address variation, a merchant category code (MCC) variation and a merchant phone number variation;

normalizing, by the computer, the merchant field value in response to determining that the format of the merchant field value corresponds to one of the recognized format variations further comprising:

determining whether the merchant name variation comprises a known merchant name variation;

in response to a positive determination that the merchant name variation comprises a known merchant name variation,     executing a related merchant name variation normalization procedure from a plurality of merchant name variation normalization procedures and store a normalized merchant name as part of a normalized field value; and   determining whether the merchant address variation comprises a known merchant address variation;

in response to a positive determination that the merchant address comprises-a known merchant address variation     executing a related merchant address variation normalization procedure from a plurality of merchant address variation normalization procedures and store a normalized merchant address as part of a normalized field value; and   determining whether the merchant MCC variation comprises a known merchant MCC variation;

in response to a positive determination that the merchant MCC variation comprises a known merchant MCC variation     executing a related merchant MCC variation normalization procedure from a plurality of merchant MCC variation normalization procedures and store a normalized MCC as part of a normalized field value; and   determining whether the phone number variation comprises a known merchant phone number variation;

in response to a positive determination that the phone number comprises a known merchant phone number variation     executing a related phone number variation normalization procedure from a plurality of merchant phone number variation normalization procedures and store a normalized phone number as part of a normalized field value; and matching, by the computer, the transaction record to a corresponding merchant profile record in the merchant profile database based on the normalized merchant field value.

5. The method of claim 4, wherein matching the transaction record further includes:

determining whether the merchant identifying data in the transaction records exactly match corresponding data in the corresponding merchant profile record.

6. The method of claim 4, further comprising:

obtaining merchant information from the corresponding merchant profile record, the merchant information including a tax ID and a merchant address.

7. The method of claim 4, wherein the merchant field comprises a merchant name and one of the recognized format variations for the merchant field comprises an inclusion of one or more extra characters in the merchant name.

8. The method of claim 7, wherein the merchant field comprises a merchant phone number and one of the recognized format variations for the merchant field comprises an inclusion of one or more special characters.

9. The method of claim 7, wherein the special characters comprise parentheses and dashes.

10. The method of claim 4, wherein the transactions records are received from a transaction records data storage.

11. The method of claim 4, wherein matching the transaction record further includes:

receiving a query response from the merchant profile database indicating whether the merchant identifying data in the query exactly matches data in the merchant profile record of the merchant profile database on a field-by-field basis.

12. The method of claim 4, wherein normalizing the merchant field value utilizes known variations and solutions contained in a known variations storage component.

13. The method of claim 4, wherein the normalized merchant field value is used to change the transaction record by replacing the merchant field value in the transaction record with the normalized merchant field value.

14. The method of claim 4, wherein the normalized merchant field value is used to change the transaction record by appending the normalized merchant field value to the merchant identifying field in the transaction record.

15. The method of claim 4, further comprising:

determining whether there are further transaction records to process.

16. The method of claim 4, further comprising:

extracting the merchant identifying data from the merchant profile database to prepare tax forms.

17. The method of claim 4, wherein the plurality of format variations for the merchant field value includes a first format variation and a second format variation, wherein determining that the format of the merchant field value corresponds to one of the recognized format variations includes determining that the format of the merchant field value matches the first format variation.

18. The method of claim 17, wherein the first format variation is associated with a first normalizing scheme and the second format variation is associated with a second normalizing scheme, wherein in response to determining that the merchant field value matches the first format variation, the merchant field value is normalized using the first normalizing scheme.

19. A method of matching transaction records to merchant records of a merchant profile database, the transaction records containing transaction data of financial presentation devices that are presentable to a plurality of merchants, the transaction data including merchant identifying data that identifies the merchant for the transaction, the method comprising:

recognizing, by a computer, a plurality of format variations for a merchant field value in a merchant field in merchant identifying data contained in a transaction record wherein the merchant field is a merchant name and one of the recognized format variations for the merchant field includes an inclusion of one or more extra characters in the merchant name;

determining, by the computer, whether a format of the merchant field value in the merchant field corresponds to one of the recognized format variations;

determining if whether the merchant field value has all of a merchant name variation, a merchant address variation, a merchant category code (MCC) variation and a merchant phone number variation;

normalizing, by the computer, the merchant field value in response to determining that the format of the merchant field value corresponds to one of the recognized format variations further comprising utilizing known variations and specific solutions for each variation in the merchant field contained in a known variations storage component to normalize the merchant field value further comprising:

determining whether the merchant name variation to known merchant name variation;

in response to a positive determination that the merchant name variation comprises a known merchant name variation, executing a related merchant name variation normalization procedure and store a normalized merchant name as part of a normalized field value; and determining whether the merchant address variation comprises a known merchant address variation;

in response to a positive determination that the merchant address comprises a known merchant address variation executing a related merchant address variation normalization procedure and store a normalized merchant address as part of a normalized field value; and determining whether the merchant MCC variation comprises a known merchant MCC variation;

in response to a positive determination that the merchant MCC variation comprises a known merchant MCC variation executing a related merchant MCC variation normalization procedure and store a normalized MCC as part of a normalized field value; and determining whether the phone number variation comprises a known merchant phone number variation;

in response to a positive determination that the phone number comprises a known merchant phone number variation executing a related phone number variation normalization procedure and store a normalized phone number as part of a normalized field value; and matching, by the computer, the transaction record to a corresponding merchant profile record in the merchant profile database based on the normalized merchant field value on a field-by-field basis comprising determining whether the merchant identifying data in the transaction records exactly match corresponding data in the corresponding merchant profile record.

20. The method of claim 19, wherein the normalized merchant field value is used to change the transaction record by either:

replacing the merchant field value in the transaction record with the normalized merchant field value or appending the normalized merchant field value to the merchant identifying field in the transaction record.

21. The method of claim 19, further comprising:

extracting the merchant identifying data from the merchant profile database to prepare tax forms.

22. The method of claim 19, wherein the plurality of format variations for the merchant field value includes a first format variation and a second format variation, wherein determining that the format of the merchant field value corresponds to one of the recognized format variations includes determining that the format of the merchant field value matches the first format variation.

23. The method of claim 22, wherein the first format variation is associated with a first normalizing scheme and the second format variation is associated with a second normalizing scheme, wherein in response to determining that the merchant field value matches the first format variation, the merchant field value is normalized using the first normalizing scheme.

* * * * *